United States Patent
Jackson, Jr. et al.

[19]

[11] Patent Number: 5,719,378
[45] Date of Patent: Feb. 17, 1998

[54] SELF-CALIBRATING TEMPERATURE CONTROLLER

[75] Inventors: John M. Jackson, Jr., Goodlettsville; Chris M. Jamison, Hendersonville, both of Tenn.

[73] Assignee: Illinois Tool Works, Inc., Glenview, Ill.

[21] Appl. No.: 752,659

[22] Filed: Nov. 19, 1996

[51] Int. Cl.⁶ .................................................. H05B 1/02
[52] U.S. Cl. ........................... 219/497; 219/483; 219/501; 364/571.04; 364/571.07; 374/1
[58] Field of Search ............................ 219/497, 501, 219/499, 506, 441, 442, 483, 486; 364/571.01, 571.03, 571.04, 571.07; 374/1

[56] References Cited

U.S. PATENT DOCUMENTS

| | | | |
|---|---|---|---|
| 3,657,926 | 4/1972 | Munson et al. | 73/404 |
| 4,059,204 | 11/1977 | Duncan et al. | 222/146 |
| 4,065,034 | 12/1977 | Callan | 226/146 |
| 4,713,783 | 12/1987 | Fletcher | 364/557 |
| 4,847,470 | 7/1989 | Bakke | 219/299 |
| 4,854,728 | 8/1989 | Baron et al. | 374/136 |
| 4,889,440 | 12/1989 | Shano | 401/1 |
| 4,908,706 | 3/1990 | Sinn | 364/400 |
| 5,098,196 | 3/1992 | O'Neill | 374/11 |
| 5,130,518 | 7/1992 | Merle | 219/497 |
| 5,186,097 | 2/1993 | Vaseloff et al. | 99/330 |
| 5,189,283 | 2/1993 | Carl, Jr. et al. | 219/497 |
| 5,324,918 | 6/1994 | Kadwell et al. | 219/506 |
| 5,377,128 | 12/1994 | McBean | 364/571.04 |
| 5,407,101 | 4/1995 | Hubbard | 222/146.5 |
| 5,419,637 | 5/1995 | Frye et al. | 374/178 |
| 5,457,302 | 10/1995 | Amano et al. | 219/492 |
| 5,521,850 | 5/1996 | Moe et al. | 364/571.01 |
| 5,633,801 | 5/1997 | Bottman | 364/482 |

*Primary Examiner*—Mark H. Paschall
*Attorney, Agent, or Firm*—Davis Chin

[57] ABSTRACT

A self-calibrating temperature controller adapted for use in controlling closely the temperature of hot-melt adhesive dispensed from an adhesive supply unit is provided. The temperature controller includes a microcomputer operated under a stored program to perform automatically a self-calibrating operation. A non-volatile memory is provided for storing RTD values in a lookup table so as to compensate for the non-linearity of the RTD sensors.

7 Claims, 6 Drawing Sheets

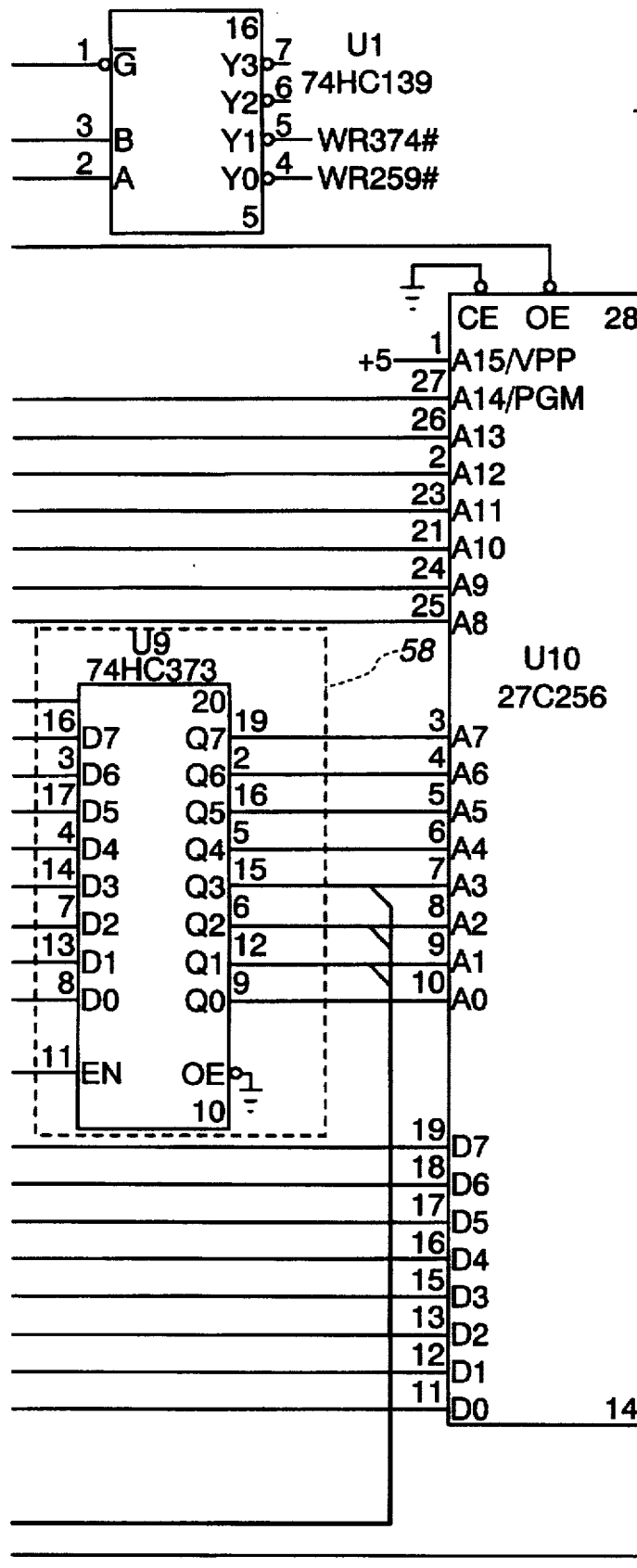
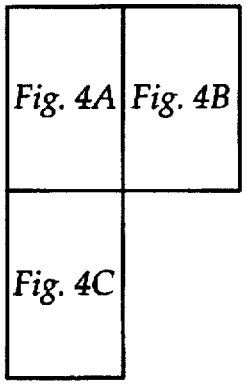
*Fig. 4B*
*Fig. 4*

SELF-CALIBRATING TEMPERATURE CONTROLLER

BACKGROUND OF THE INVENTION

1. Field of the Invention

This invention relates generally to apparatuses for applying a hot-melt adhesive and the like. More particularly, it relates to a self-calibrating temperature controller adapted for use in controlling closely the temperature of hot-melt adhesive dispensed from an adhesive supply unit.

2. Description of the Prior Art

As is generally known in the art, there have been provided heretofore temperature controllers for controlling the temperature of an adhesive to be dispensed which includes a temperature sensor for detecting the temperature of the adhesive and for generating an analog voltage proportional to the temperature. Thereafter, these prior art temperature controllers utilize an analog-to-digital converter for converting the analog voltage into a digital signal. However, these prior art sensing schemes suffered from the disadvantage that the A/D conversion process is inherently sensitive to electrical noise. As a result, any noise appearing at the time when the A/D conversion is being performed will be incorporated into the temperature reading, thereby causing inaccuracies and unreliable measurements. Another problem encountered in the prior art designs is that they required calibration which increases manufacturing, assembly, and labor costs.

Accordingly, it would be desirable to provide a more accurate and reliable temperature controller for controlling the temperature of the adhesive. Further, it would be expedient to provide a temperature controller which eliminates the need for manual calibration.

A prior art search directed to the subject matter of this application in the U.S. Patent and Trademark Office revealed the following U.S. Letters Patent:

| | |
|---|---|
| 4,059,204 | 5,130,518 |
| 4,065,034 | 5,324,918 |
| 4,847,470 | 5,407,101 |
| 4,889,440 | 5,457,302 |
| 5,098,196 | |

In U.S. Pat. No. 4,065,034 to J. E. Callan issued on Dec. 27, 1977, there is taught a gun-type dispenser for heating and dispensing a heat softenable adhesive or sealant compound during non-commercial projects. The dispenser includes electrical heating elements for heating the outer end of the barrel of the dispenser.

In U.S. Pat. No. 4,889,440 to C. L. Shano issued on Dec. 26, 1989, there is disclosed a roller applicator for applying a coating of molten wax to a desired surface which includes a bowl wherein wax is melted and heated to a high working temperature by an electrical heating resistor under the thermal control of a first thermistor. A second thermistor is positioned so that the degree of immersion thereof in the molten wax decreases as the wax level drops for generating a "low wax" indication.

In U.S. Pat. No. 5,059,196 to M. J. O'Neill issued on Mar. 24, 1992, there is disclosed a circuit arrangement for heating and measuring temperature in an analytical instrument. A three section circuit is used to compute differential power applied to the resistance elements which is used to measure the differential heating or cooling in a test sample compared with the standard. The three section circuit includes a first analog section, a digital section, and a second analog section. The digital section is formed of a voltage-to-frequency converter for converting an analog voltage to a frequency.

In U.S. Pat. No. 5,324,918 to B. J. Kadwell et al. issued on Jun. 28, 1994, there is illustrated a temperature regulating control system for controlling the operations of a cooking apparatus. The control system includes a RTD temperature sensor means for sensing the temperature in an oven, an A/D converter connected between the RTD temperature sensor means and a microcomputer. A varying voltage is applied to the sensor rather than a constant current excitation by means of the microcomputer, a network, and an operational amplifier circuit.

The remaining patents listed above but not specifically discussed are deemed to be of general interest and to show the state of the art in systems for dispensing an adhesive and the like and means for controlling the temperature thereof.

However, none of the prior art discussed above teach an adhesive supply unit for dispensing a hot-melt adhesive like that of the present invention which includes a temperature controller having a microcomputer operated under a stored program to perform an automatic self-calibrating operation. The present invention represents significant improvements over the prior art discussed above. This is accomplished in the present invention by the provision of a voltage-to-frequency converter for converting the voltage corresponding to the temperature sensed by a temperature sensor so as to be highly immune from electrical noise. The automatic self-calibration is achieved by scanning periodically the values of two precision resistors, one corresponding to a high temperature and the other one corresponding to a low temperature and feeding the values into a microcomputer which mathematically linearizes the transfer function across the temperature range.

SUMMARY OF THE INVENTION

Accordingly, it is a general object of the present invention to provide an improved adhesive supply unit for dispensing of hot-melt adhesive which includes a temperature controller having a microcomputer operated under a stored program to perform an automatic self-calibrating operation.

It is an object of the present invention to provide a self-calibrating temperature controller adapted for use in closely controlling the temperature of hot-melt adhesive dispensed from an adhesive supply unit.

It is another object of the present invention to provide an improved temperature controller for controlling the temperature of the adhesive on a more accurate and reliable basis.

It is still another object of the present invention to provide an improved temperature controller which includes a voltage-to-frequency converter for converting the voltage corresponding to the temperature as sensed by a temperature sensor to a frequency so as to be highly immune from electrical noise.

It is yet still another object of the present invention to provide an improved temperature controller which includes a microcomputer for scanning periodically the values of two precision resistors so as to mathematically linearize the transfer function across the temperature range.

In accordance with a preferred embodiment of the present invention, there is provided a self-calibrating temperature controller adapted for use in controlling closely the temperature of hot-melt adhesive dispensed from an adhesive supply unit. The temperature controller includes means for setting a desired temperature in a plurality of zones of the adhesive supply unit. Temperature sensing means is provided for measuring a temperature in each of the plurality of zones of the adhesive supply unit and for generating analog voltage signals corresponding to the measured temperatures. A voltage-to-frequency converter is provided to convert the analog voltages to frequency signals corresponding to the measured temperatures.

A microcomputer is used to compare the frequency signals to the desired temperatures for generating temperature control signals to regulate the amount of current supplied to heaters located in the corresponding zones based upon the comparisons. An automatic self-calibrating circuit is used to generate a low calibration temperature signal corresponding to a low temperature and a high calibration temperature signal corresponding to a high temperature. The microcomputer is operated under a stored program for continuously scanning the low temperature signal and the high temperature signal and for adjusting the measured temperatures so as to eliminate drift.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIGS. 4a, 4b and 4c, when connected together, is a schematic circuit diagram showing circuitry suitable for use in the blocks 54, 56, 58 60, and 62 of FIG. 2.

DESCRIPTION OF THE PREFERRED EMBODIMENT

It is to be distinctly understood at the outset that the present invention hereinafter illustrated and described as being particularly adapted for use in closely controlling the temperature of hot-melt adhesive dispensed from an adhesive supply unit is not intended to serve as a limitation upon the scope or teachings thereof, but is merely for the purpose of convenience of illustration of one example of its application. The present invention has numerous applications in other fields and apparatus since the invention pertains to an automatic self-calibrating temperature controller for controlling temperature on a more accurate and reliable basis.

Figure 1:
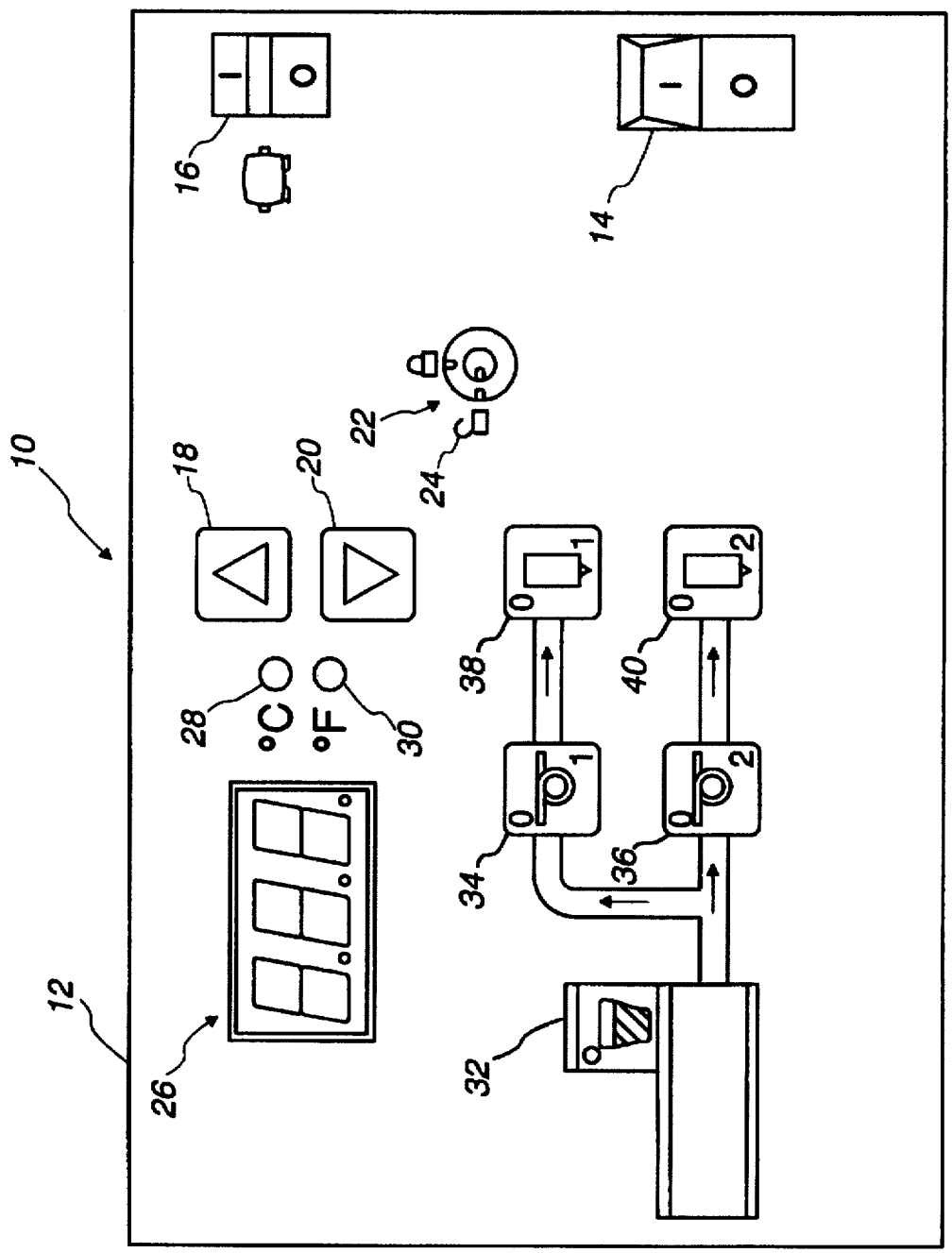
FIG. 1 is a pictorial representation of a keypad layout of a temperature controller of the present invention.

Referring now in detail to the drawings, there is shown in FIG. 1 a self-calibrating temperature controller of the present invention and is generally designated by reference numeral 10. The temperature controller 10 is a microcomputer based, multiple channel device adapted for use in an adhesive supply unit (not shown) which closely controls the temperature of hot-melt adhesive for a hopper, two hoses, and two heads/applicators (five zones). The temperature set-points for these five zones are operator-selected. The adhesive supply unit may accommodate air-actuated automatic applicators (heads), electric applicators, hand-held applicators, and/or special applicators.

The temperature controller 10 is comprised of a keypad layout 12 which includes a Main Power Switch 14 for turning on and off the power, a pump switch 16 for turning on and off the pump, an up-pushkey 18, a down-pushkey 20, and a key switch 22. When the key switch is in the locked position, the pushkeys 18 and 20 are disabled so as to prevent the changing of the programmed set-points. Programming is accomplished only when the key switch 22 is in the unlocked position 24. The keypad layout 12 further includes a seven-segment LED digital readout display 26, temperature scale indicator lights 28 (degrees Celsius), and 30 (degrees Fahrenheit), a pushbutton/LED 32 for hopper temperature, a pushbutton/LED 34 for a first hose temperature, a pushbutton/LED 36 for a second hose temperature, a pushbutton/LED 38 for a first applicator temperature, and a pushbutton/LED 40 for a second applicator temperature.

Figure 2:
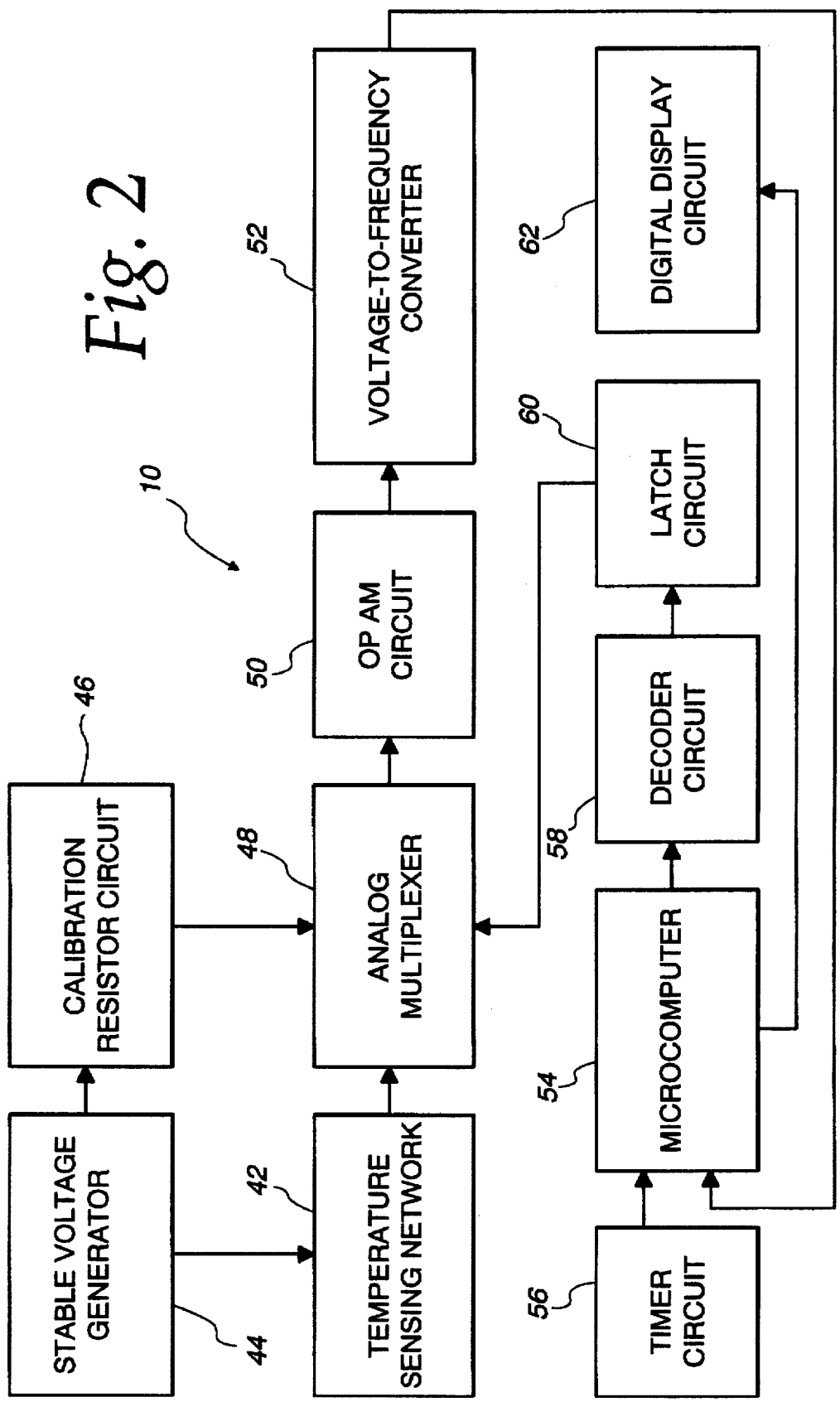
FIG. 2 is a simplified block diagram of a temperature controller, constructed in accordance with the principles of the present invention.
Figure 3:
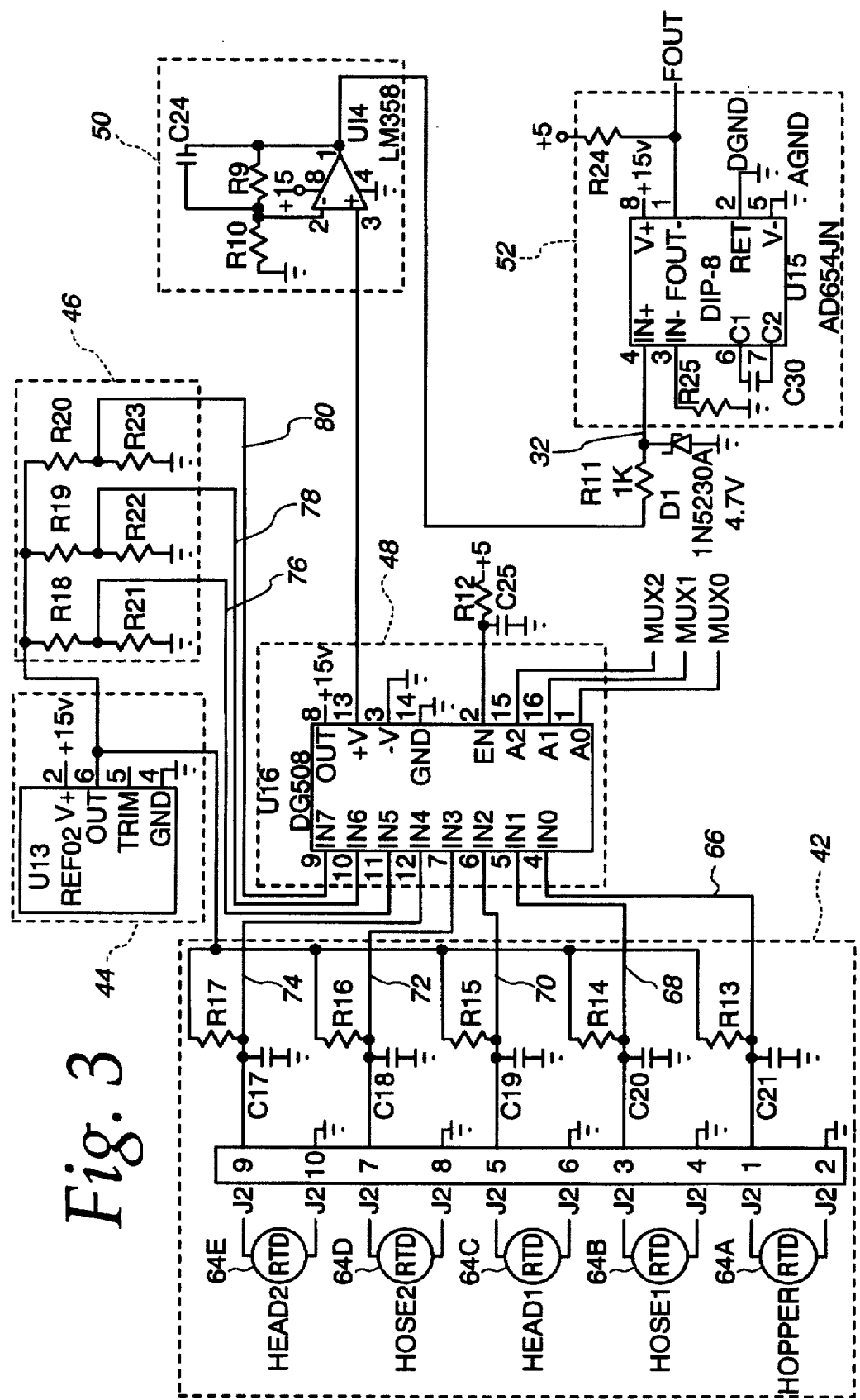
FIG. 3 is a schematic circuit diagram, showing circuitry suitable for use in the blocks 42, 44, 46, 48, 50, and 52 of FIG. 2.
Figure 4A:
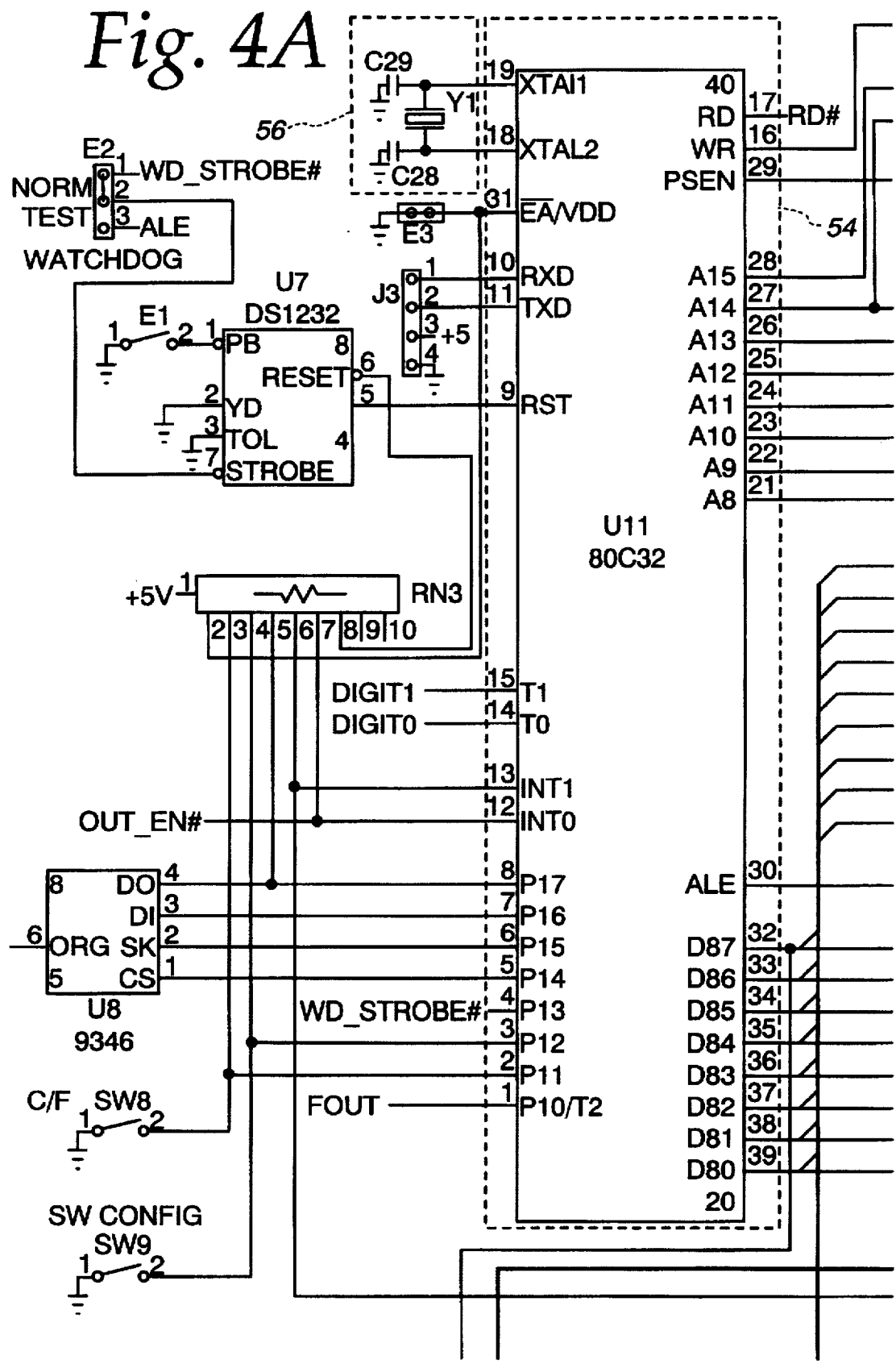
Figure 4C:
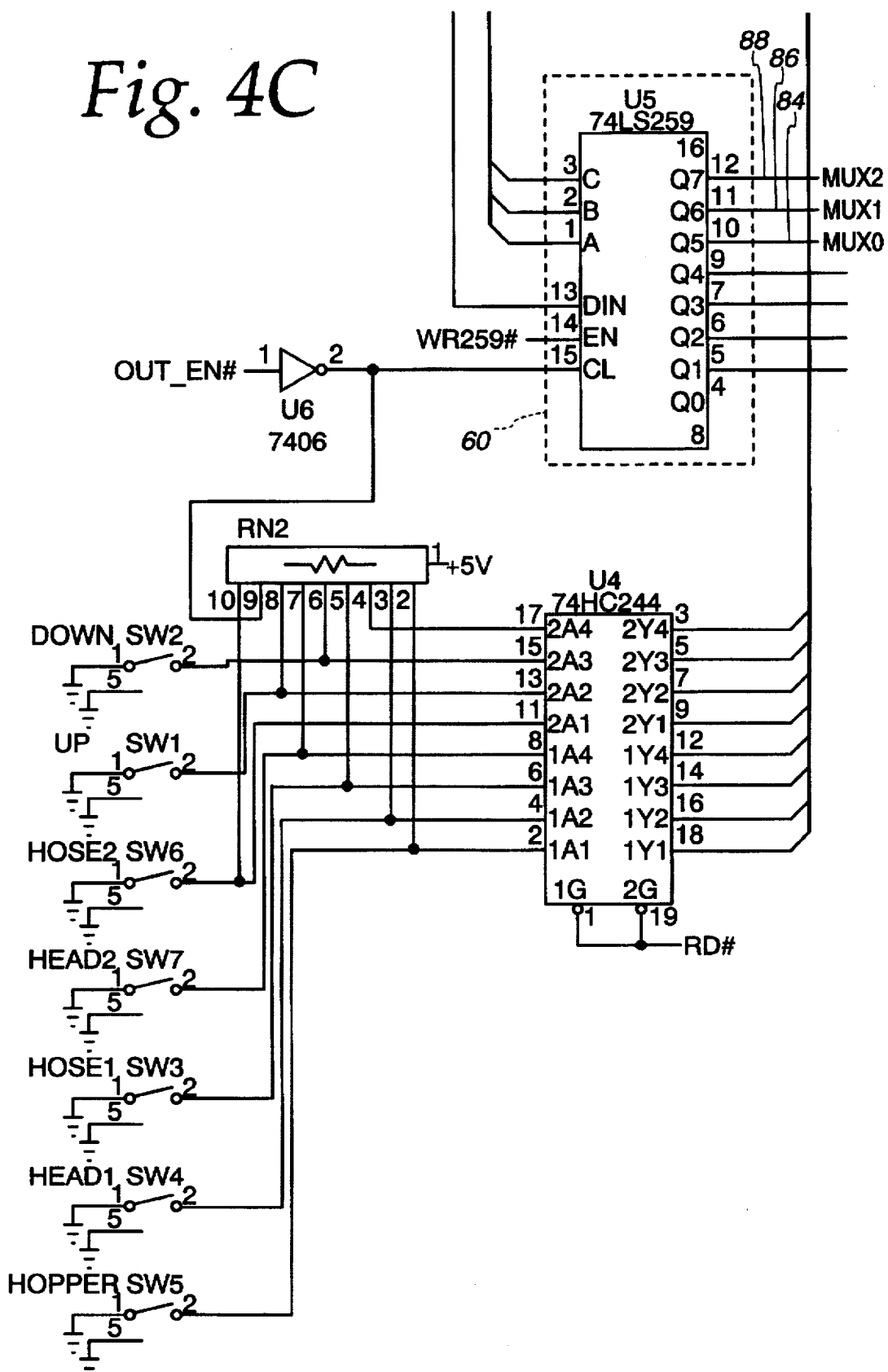

In FIG. 2, there is illustrated a simplified electrical block diagram of the temperature controller 10, constructed in accordance with the principles of the present invention. As can be seen, the temperature controller 10 is formed of a temperature sensing network 42, a stable voltage generator 44, a calibration resistor circuit 46, an analog multiplexer 48, an operational amplifier circuit 50, and a voltage-to-frequency converter 52. The temperature controller 10 further includes a microcomputer 54, a timer circuit 56, a decoder 58, a latch circuit 60, and a digital display circuitry 62. FIG. 3 is a detailed schematic circuit diagram of circuitry suitable for use in the blocks 42, 44, 46, 48, 50 and 52 of FIG. 2. FIGS. 4a, 4b and 4c, when connected together, is a detailed schematic circuit diagram of circuitry suitable for use in the blocks 54, 56, 58, 60 and 62 of FIG. 2.

As shown in FIG. 3, the temperature sensing network 42 includes a plurality of resistance temperature detector (RTD) sensors 64a–64e for measuring or sensing the respective temperatures in the five zones, namely: HOPPER, HOSE1, HEAD1, HOSE2, and HEAD2. Each of the RTD sensors 64a–64e is comprised of a 100-ohm platinum resistance temperature detector whose electrical resistance increases directly as the temperature of the detector increases and thus has a positive temperature coefficient. In view of this, the voltage developed across each detector is very accurate.

The HOPPER RTD sensor 64a is connected in series with one end of a high precision resistor R13 (0.1%) so as to form a voltage divider. The other end of the resistor R13 is connected to the stable voltage generator 44. The voltage generator 44 is formed of an integrated circuit U13, which is a voltage regulator for producing a precise reference voltage such as +5.0 VDC on its output pin 6. The integrated circuit U13 may be similar to type REF02 which is commercially available from Motorola, Inc. The other end of the RTD sensor 64a is connected to a ground potential.

The junction of the RTD sensor 64a and the resistor R13 provides a first sensed output voltage on line 66 which is directly proportional to the temperature of the HOPPER RTD sensor 64a and thus the HOPPER temperature. This output voltage is fed to a first input of the analog multiplexer 48. The multiplexer is formed of an integrated circuit U16, which may be similar to type DG508 also available from Motorola, Inc. Thus, the first sensed output voltage on the line 66 is connected to pin 4 of the integrated circuit U16.

The HOSE1 RTD sensor 64b is connected in series with a high precision resistor R14 so as to form a voltage divider between the reference voltage and the ground potential. The junction of the RTD sensor 64b and the resistor R14 provides a second sensed output voltage on line 68, which is directly proportional to the temperature of the HOSE1 RTD sensor 64b and thus the HOSE1 temperature. This second sensed output voltage is fed to pin 5 of the integrated circuit U15. The HEAD1 RTD sensor 64c is connected in series with a high precision resistor R15 so as to form a voltage divider between the reference voltage and the ground potential. The junction of the RTD sensor 64c and the resistor R15 provides a third sensed output voltage on line 70 which is directly proportional to the HEAD1 temperature.

Similarly, the HOSE2 RTD sensor 64d and the HEAD2 RTD sensor 64e are connected in series with respective resistors R16 and R17 so as to form additional voltage dividers. The junction of the RTD sensor 64d and the resistor R16 provides a fourth sensed output voltage on line 72 which is directly proportional to the HOSE2 temperature. Likewise, the junction of the RTD sensor 64e and the resistor R17 provides a fifth sensed output voltage on line 74 which is directly proportional to the HOSE2 temperature. The respective third, fourth and fifth sensed output voltages are connected to corresponding pins 5, 6, and 12 of the integrated circuit U15.

The calibration resistor circuit 46 includes three parallel branches, the first being formed of series-connected precision resistors R18 and R21, the second being formed of series-connected precision resistors R19 and R22, and the third being formed of series-connected precision resistors R20 and R23. Each of the three parallel branches forms a voltage divider connected between the stable reference voltage (+5.0 VDC) and the ground potential. The junction of the precision resistors R18 and R21; R19 and R22; and R20 and R23 on the respective lines 76, 78 and 80 are connected to corresponding pins 11, 10 and 9 of the integrated circuit U16. The voltages developed across the precision resistors R21, R22 and R23 simulate the precision temperatures of 101.5° F., 445.9° F., and 125° F. The voltage on the line 76 defines a low calibration temperature signal corresponding to a low temperature. The voltage on the line 78 defines a high calibration temperature signal corresponding to a high temperature. The voltage on the line 80 is generally not used.

By controlling the signals applied to pins 1, 16 and 15 of the integrated circuit U16, the various sensed output voltages from the RTD sensors 64a–64e and the calibration signals from the calibration circuit 46 are selectively connected from the input of the multiplexer to its output on pin 8 (Vin). This voltage Vin is connected to the input of the operational amplifier circuit 50. The operational amplifier circuit includes an integrated circuit U14, resistors R9, R10 and capacitor C24. The integrated circuit U14 is connected in a non-inverting configuration so as to provide a gain of 11. The voltage Vin from the multiplexer U16 is connected to pin 3 of the integrated circuit U14, and an amplified voltage is generated on pin 1 of the integrated circuit U14. The integrated circuit U14 may be similar to type LM358, which is commercially available from National Semiconductor.

The voltage-to-frequency converter 52 is comprised of an integrated circuit U15, which is similar to type AD654JN commercially available from Motorola, Inc. The output voltage Vout on line 82 is connected to pin 4 of the integrated circuit U15. This analog voltage is converted to a corresponding frequency and is generated on its output pin 1 (Four). In the Table listed below, there is shown the complete transfer function from temperature in degrees Fahrenheit in Column A to the output frequency in KHz in Column F:

TABLE

| (A) TEMP. DEG. F. | (B) TEMP. DEG. C. | (C) RTD OHMS | (D) Vin VOLTS | (E) Vout VOLTS | (F) Fout KHz |
|---|---|---|---|---|---|
| 32 | 0 | 100.00 | 98 | 1.079 | 107.9 |
| 50 | 10 | 103.90 | 102 | 1.120 | 112.0 |
| 104 | 40 | 115.54 | 113 | 1.242 | 124.2 |
| 149 | 65 | 125.15 | 122 | 1.343 | 134.3 |
| 203 | 95 | 136.60 | 133 | 1.463 | 146.8 |
| 248 | 120 | 146.06 | 142 | 1.561 | 156.1 |
| 302 | 150 | 157.32 | 153 | 1.678 | 165.8 |
| 356 | 180 | 168.47 | 163 | 1.793 | 179.3 |
| 401 | 205 | 177.68 | 172 | 1.888 | 188.8 |
| 455 | 235 | 188.64 | 182 | 2.000 | 200.0 |
| 500 | 260 | 197.69 | 190 | 2.092 | 209.2 |
| 932 | 500 | 280.93 | 266 | 2.926 | 292.5 |

With reference now to FIGS. 4a, 4b and 4c of the drawings, the microcomputer 54 is comprised of an integrated circuit U11, which may be similar to type 80C32 commercially available from Motorola, Inc. The timer circuit 56 includes capacitors C28, C29 and a crystal Y1 which are connected to the integrated circuit U11 at pins 18 and 19. The timer circuit is used to establish the sampling and counting operation of the microcomputer U11. In the preferred embodiment, the timer circuit has been set to a frequency of approximately 11.0592 MHz through the crystal Y1. The capacitors C28 and C29 function to stabilize the crystal Y1. The output frequency Fout from the voltage-to-frequency converter U14 is connected to pin 1 of the microcomputer U11. The microcomputer counts this output frequency Four for a precise time as determined by the crystal Y1. This count value is now a digital representation of the temperature value of one of the input voltages as selected by the microprocessor U16.

The input voltages on the pins 4–7 and 9–12 of the multiplexer are selected on the basis of the values on the terminals MUX0, MUX1, and MUX2 on respective lines 84, 86 and 88, which are controlled by the microcomputer via the decoder 58 and the latch circuit 60. The decoder 58 is comprised of an integrated circuit U9 which is similar to type 74HC373 and the latch circuit 60 is comprised of integrated circuit U5 which is similar to type 74LS259. The microprocessor also drives the digital display circuitry 62 via drivers U1–U3 for displaying the actual temperatures for the five zones. The temperature display circuitry 62 includes the seven-segment LED display units DISP1–DISP3.

The automatic self-calibrating temperature controller 10 of the present invention is a significant improvement over the known prior art temperature sensing circuits in a number of ways. First, the sensed voltage corresponding to the five zones are converted to a frequency value. This sensing technique provides for an enhanced performance and accuracy since it inherently produces a time average of the sensed voltage reading and has high immunity to electrical noise. Further, the temperature controller 10 provides an automatic self-calibrating step on a continuous basis so as to compensate for the tolerances in the values of the RTD sensors 64a–64e as well as the tolerance variations in the circuit elements in the blocks 48–52. As a consequence, the need for a manual calibration has been eliminated as well as eliminating drift variations over time.

To automatic self-calibrate, the microprocessor scans continuously for the "counts" obtained from the precision resistors R21 and R22. As previously pointed out, the voltage across the precision resistor R21 on line 76 has a precise voltage value corresponding to the desired low end of the temperature range (i.e., 100° F.), of the RTD sensors. Similarly, the voltage across the precision resistor R22 on the line 78 has a precise voltage value corresponding to the desired high end of the temperature range (i.e., 450° F.) of the RTD sensors. The microcomputer U11 stores the "counts" obtained from the precision resistors R21 and R22 and uses an algorithm to linearize the transfer function across the temperature range. In other words, any sensed output voltage from the RTD sensors proportional to its resistance will be correctly digitized to correspond to a temperature between 100° F. and 450° F.

Further, it will be noted that while the platinum RTD sensors are quite linear, they are not perfectly linear. In order to compensate for this non-linearity, the lookup Table discussed above is stored in a non-volatile memory such as a ROM or EEPROM of the microcomputer, and the microcomputer will shift the measured temperatures so that no substantial error will exist.

In normal operation, the temperature set-points corresponding to each of the five zones will be initially entered via the pushkeys 18 and 20 on the keypad layout 12 of FIG. 1. The temperature of each zone is measured or detected by the corresponding RTD sensors 64a–64e. After taking a temperature measurement for a particular zone, the software in the microcomputer U11 utilizes a PID (Proportional Integral Derivative) algorithm to compare the associated set-point signal with the temperature signal from the corresponding RTD sensor and will calculate an appropriate output heater power for that zone needed to maintain the desired set-point. This is accomplished by switching AC current to heaters located in the zone to effect the amount of heating. In other words, if the microcomputer U11 determines from the software that heat is required, then the duty cycle of the AC current to the heater is increased. On the other hand, if the microprocessor determines that there is too much heat, then the duty cycle of the AC current to the heater will be decreased. This procedure is repeated continuously for each of the remaining zones.

In this fashion, the microcomputer U11 of the temperature controller 10 of the present invention regulates the amount of heat from the heater to the zones by continuously sampling the temperature as detected by the RTD sensor and comparing it to the desired set-point. It should be understood that the microprocessor will be also continuously sampling the "temperature" from the precision resistors R21 and R22 in order to perform the automatic self-calibrating step so as to eliminate drift and will utilize the RTD values in the lookup Table to compensate for its non-linearity.

From the foregoing detailed description, it can thus be seen that the present invention provides an improved temperature controller adapted for use in controlling closely the temperature of hot-melt adhesive dispensed from an adhesive supply unit. The temperature controller includes a microcomputer operated under a stored program to perform automatically a self-calibrating operation. RTD values are stored as a look-up Table in a non-volatile memory so as to compensate for its non-linearilty.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An automatic self-calibrating temperature controller adapted for use in controlling closely the temperature of hot-melt adhesive dispensed from an adhesive supply unit, said temperature controller comprising:

means for setting a desired temperature in a plurality of zones of said adhesive supply unit;

temperature sensing means for measuring temperatures in the zones of said adhesive supply unit and for generating analog voltage signals corresponding to said measured temperatures;

said temperature sensing means being formed of a plurality of temperature sensors, each of said plurality of temperature sensors being connected in series with a corresponding one of high precision resistors so as to form a voltage generator and a ground potential, the junctions of said plurality of temperature sensors and said corresponding one of the high precision resistors producing said analog voltage signals;

means for converting said analog voltages to frequency signals corresponding to said measured temperatures;

said means for converting said analog signals being formed of a voltage-to-frequency converter;

microcomputer means for comparing said frequency signals to said desired temperatures for generating temperature control signals to regulate the amount of current supplied to heaters located in the zones based upon said comparison;

automatic self-calibrating means for generating a low calibration temperature signal corresponding to a low temperature and a high calibration temperature signal corresponding to a low temperature;

said automatic self-calibrating means being formed of a calibration resistor circuit having first and second parallel branches connected between said stable voltage generator and the ground potential, said first parallel branch including series-connected first and second precision resistors in which the voltage at their junction produces a value corresponding to the low temperature, said second parallel branch including series-connected third and fourth precision resistors in which the voltage at their junction produces a value corresponding to the high temperature; and said microcomputer means being operated under a stored program for continuously scanning said low temperature signal and said high temperature signal and for adjusting said measured temperatures so as to eliminate drift.

2. An automatic self-calibrating temperature controller as claimed in claim 1, wherein said temperature sensing means comprises a plurality of RTD sensors.

3. An automatic self-calibrating temperature controller as claimed in claim 1, further comprising a lookup table stored in a non-volatile memory and said microcomputer utilizing said look-up table to compensate for non-linearity in said RTD sensors.

4. An automatic self-calibrating temperature controller as claimed in claim 1, wherein said plurality of zones includes a hopper, a first hose, a first head, a second hose and a second head.

5. An automatic self-calibrating temperature controller as claimed in claim 1, wherein said low temperature is approximately 100° F. and said high temperature is approximately 450° F.

6. An automatic self-calibrating temperature controller as claimed in claim 1, further comprising display means responsive to said temperature control signals for indicating the temperatures of said zones.

7. An automatic self-calibrating temperature controller as claimed in claim 1, wherein said means for setting said desired temperatures comprises pushkeys located on a keypad layout.

* * * * *